United States Patent [19]

Kanazawa et al.

[11] Patent Number: 5,124,397

[45] Date of Patent: Jun. 23, 1992

[54] RESIN COMPOSITION FOR SLIDING MOVEMENT AND SEALING MEMBER COMPRISING SAME

[75] Inventors: Shuji Kanazawa, Yokohama; Tetsuo Shimizu, Yokosuka, both of Japan

[73] Assignee: Nippon Petrochemicals Company, Limited, Tokyo, Japan

[21] Appl. No.: 687,311

[22] Filed: Apr. 18, 1991

[30] Foreign Application Priority Data

| Apr. 19, 1990 [JP] | Japan | 2-101687 |
| Apr. 23, 1990 [JP] | Japan | 2-105272 |
| Apr. 23, 1990 [JP] | Japan | 2-105273 |
| Apr. 23, 1990 [JP] | Japan | 2-105274 |

[51] Int. Cl.$^5$ .................................................. C08K 3/04
[52] U.S. Cl. ......................................... 524/496; 524/495
[58] Field of Search ................................. 524/495, 496

[56] References Cited

U.S. PATENT DOCUMENTS 4,851,467 7/1989 Frayer ............................... 524/496

FOREIGN PATENT DOCUMENTS 63-254159 10/1988 Japan ................................. 524/496

Primary Examiner—Paul R. Michl
Assistant Examiner—Yong S. Lee
Attorney, Agent, or Firm—Scully, Scott, Murphy & Presser

[57] ABSTRACT

Provided is a resin composition for sliding movement, comprising (a) 90–30% by weight of a thermotropic liquid crystalline polymer which is a (co)polymer containing at least a monomer unit represented by the following formula and (b) 10–70% by weight of a spherical glassy carbon characterized by a particle fracture surface having a glassy luster and exhibiting a loss in weight of not more than 5% by weight when held in air at 350° C. for 30 minutes:

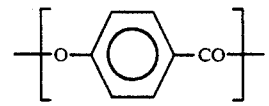

9 Claims, 2 Drawing Sheets

RESIN COMPOSITION FOR SLIDING MOVEMENT AND SEALING MEMBER COMPRISING SAME

BACKGROUND OF THE INVENTION

The present invention relates to a resin composition having an excellent sliding property and more particularly to a resin composition having a sliding property and employable under severe conditions in which a mating material is a metal and the resin composition is used in a part sliding at high speed under a high load (the temperature of the said part inevitably rises to a high level due to frictional heat). The present invention is also concerned with an improved sealing member comprising the said resin composition and used in a scroll type compressor or a vacuumpump.

Recently, various synthetic resin products have come to be used as mechanical parts for reducing the weight of machine and product cost. Also as parts for which sliding property is required, synthetic resin products are now utilized frequently.

Heretofore, as resin compositions superior in sliding property there have been used those comprising resins such as polyamide, polyacetal, polyphenylene sulfide and polytetrafluoroethylene resins, and an additive for improving the sliding characteristic such as a solid lubricant or a lubricating oil.

Such conventional resin compositions are employable without causing any special problem in the region of relatively low load and speed, but as the load and speed increase, they become easier to be worn out, or may seize or melt to an unemployable extent due to frictional heat. For the purpose of improving the abrasion resistance and heat resistance there are used glass fibers, carbon fibers and various whiskers. But these fillers involve a problem of causing wear of metal or resin of a mating member used in a sliding portion.

More particularly, sliding characteristics required for sliding portions which slide at high load and speed are physical properties, including abrasion resistance and heat resistance, rather than coefficient of friction, unlike the prior art, so it is necessary to select materials from a standpoint entirely different from the conventional standpoint on sliding portions.

Among various plastic materials, high melting, thermotropic, liquid crystalline polymers are high in the resistance to heat, so do not seize or melt due to frictional heat.

Usually, a mating member in a sliding part is constituted by a metallic material such as aluminum alloy or steel. Since thermotropic liquid crystalline polymers per se are inferior in the abrasion resistance in comparison with such metals, so have not been used in such sliding portions as mentioned above.

The present inventors found out that a so-called glassy carbon characterized by its particle fracture surface having a glassy luster is effective as an additive capable of solving the above-mentioned problems involved in thermotropic liquid crystalline polymers. However, such glassy carbon sometimes contains an incompletely carbonized or uncarbonized substance because it is produced by carbonizing a thermosetting resin such as a phenolic resin.

Even in the case of a glassy carbon which has been identified by having a glassy luster at a fracture surface thereof or by having a wide peak at a specific diffraction angle in an X-ray diffraction pattern thereof, it sometimes contains an incompletely carbonized or uncarbonized substance.

In the case of incorporating a glassy carbon into a thermoplastic resin, the presence of such incompletely carbonized or uncarbonized substance usually causes no problem in the molding step of the thermoplastic resin or in the resulting molded product. This is because such incompletely carbonized or uncarbonized substance is considered to be the starting thermosetting resin itself of the glassy carbon, or a thermally decomposed oligomer thereof.

One feature of the aforementioned thermotropic liquid crystalline polymers resides in their melting point which is very high even to an abnormal extent, and hence their molding temperature is extremely high. In this case, the foregoing incompletely carbonized or uncarbonized substance contained in a glassy carbon is apt to decompose and evolve gas. Particularly in molding at high temperature and pressure such as compression or injection molding, the evolution of gas, even in a very small amount, causes a serious defect in the molding process or in the resulting molded product. In the extreme case, it is difficult to effect the molding itself due to the evolution of gas, or blister may be recognized on the surface of the resulting molded product, thus leading to the loss of commercial value of the product.

In a scroll compressor, a pair of scroll members are arranged in mesh with each other, one scroll being fixed and the other being allowed to revolve along a certain radius, and the space surrounded by both scroll members is gradually contracted toward the center to compress gas. In a scroll type vacuum pump, the relative rotation between the fixed and movable scrolls is in a reverse relation as compared with that in the compressor. Usually, as the material of these scroll members there is used a metallic material such as aluminum alloy or steel.

In the scroll type compressor or vacuum pump, it is very important to attain a good sealing property of the sliding portion between both scroll members, and to this end a sealing member is fitted in the end faces of the scroll members.

Therefore, such sealing member is required to have not only sealing property and sliding property such as abrasion resistance but also resistance to heat, creep and chemicals. In other words, extremely strict conditions are required as compared with ordinary sliding conditions.

Heretofore, as such sealing member there has been mainly used a sealing member comprising polytetrafluoroethylene resin and fillers. However, a composition containing polytetrafluoroethylene resin as a main component cannot be subjected to injection molding, and a desired product is obtained, for example by punching a compression-molded flat plate, so the productivity is poor and the product cost is inevitably high.

Compositions containing aromatic polyether ketone resins, polyallylene sulfide resins, or polyether imide resins, as main components, can be subjected to injection molding, but are still unsatisfactory in point of heat resistance at a high temperature during the operation of a compressor or a vacuum pump and the resistance to fron gas used as a refrigerant in the compressor.

The vortical sealing member used in a scroll type compressor or vacuum pump is small in sectional area and long, as shown in FIG. 1, so the injection molding using a conventional resin is difficult to be performed because the fluidity of the resin is not satisfactory. Also in point of sliding property, conventional resins have been unsatisfactory.

The present invention has been accomplished for overcoming the above-mentioned problems and it is the object of the invention to provide a resin composition for sliding movement superior in abrasion resistance, having heat resistance, easy to be molded, and capable of affording molded products of high commercial value, and also provide a sealing member in a scroll type compressor or vacuum pump, superior in the resistance to heat and to fron gas, capable of being subjected to injection molding, and further superior in productivity.

SUMMARY OF THE INVENTION

The present invention, the first aspect thereof, resides in a resin composition for sliding movement comprising (a) 90-30 wt % of a thermotropic liquid crystalline polymer which is a (co) polymer containing at least a monomer unit represented by the following formula (1):

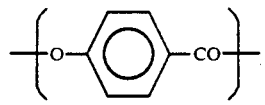 (1)

and (b) 10-70 wt % of a spherical glassy carbon characterized by a particle fracture surface having a glassy luster and exhibiting a loss in weight of not larger than 5 wt % when held in air at 350° C. or 30 minutes.

The present invention, in the second aspect thereof, resides in a resin composition for movement comprising (a) 87-40 wt % of a thermotropic liquid crystalline polymer which is a (co) polymer containing at least a monomer unit represented by the above formula (1), (b) 10-50 wt % of a spherical glassy carbon characterized by a particle fracture surface having a glassy luster and exhibiting a loss in weight of not more than 10 wt % when held in air at 350° C. for 30 minutes, and (c) 3-40 wt % of graphite, provided the total of the components (a), (b) and (c) is 100 wt %.

The present invention, in the third aspect thereof, resides in a resin composition for sliding movement comprising (a) 87-40 wt % of a thermotropic liquid crystalline polymer which is a (co) polymer containing at least a monomer unit represented by the above formula (1), (b) 10-50 wt % of a spherical glassy carbon characterized by a particle fracture surface having a glassy luster and exhibiting a loss in weight of not more than 10 wt % when held in air at 350° C. for 30 minutes, and (c) 3-20 wt % of a fluorocarbon resin, provided the total of the components (a), (b) and (c) is 100 wt %.

The present invention, in the fourth aspect thereof, resides in a sealing member to be fitted in end faces of a pair of scroll members arranged in mesh with each other in a scroll type compressor or vacuum pump, said sealing member being formed by a polymer composition comprising as essential components (a) 90-50 wt % of a thermotropic liquid crystalline polymer which is a (co) polymer containing at least a monomer unit represented by the above formula (1) and (b) 10-50 wt % of a spherical glassy carbon characterized by a particle fracture surface having a glassy luster and exhibiting a loss in weight of not more than 5 wt % when held in air at 350° C. for 30 minutes, provided the total of the components (a) and (b) is 100 wt %.

Figure 1:
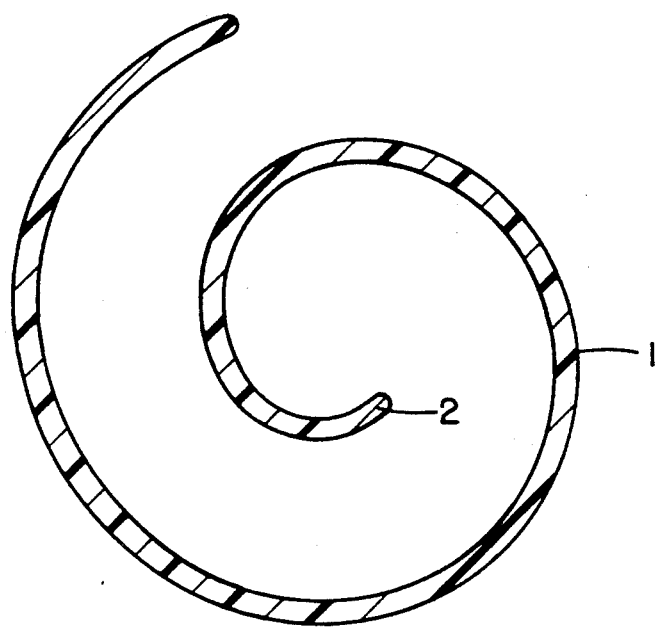
FIG. 1 is an illustrative view of an example of a sealing member used in a scroll type compressor or a vacuum pump.

In these figures, 1 is a sealing member, 2 is a position of a gate at injection molding, 3 is a scroll member and 4 is a terminal portion.

DETAILED DESCRIPTION OF THE INVENTION

The present invention will be described in more detail hereinunder.

The "thermotropic liquid crystalline polymer" as referred to herein indicates a thermoplastic meltable polymer which exhibits optical anisotropy in a molten condition. Such a polymer exhibiting optical anisotropy in a molten condition has the property that molecular chains thereof are arranged regularly in parallel in a molten condition. The property of an optically anisotropic melt phase can be confirmed by a conventional polarization test method utilizing an orthogonal polarizer.

The thermotropic liquid crystalline polymer is generally produced from a monomer which is elongated, flat, highly rigid along long molecular chains, and has a plurality of chain extention bonds either coaxial or parallel.

As an example of the thermotropic liquid crystalline polymer used in the present invention there is included a polymer wherein a portion of a high molecular chain is constituted by polymer segments which form an anisotropic melt phase and the remaining portion is constituted by thermoplastic resin segments which do not form an anisotropic melt phase. A composite of plural thermotropic liquid crystalline polymers is also included as an example of the thermotropic liquid crystalline polymer used in the invention.

As the thermotropic liquid crystalline polymer there is used a polymer or copolymer which contains a hydroxybenzoyl group represented by the foregoing formula as a monomer unit. It is desirable that the hydroxybenzoyl group [formula (1)] be present in a proportion of at least 20 mole %, preferably 30-80 mole % of all monomer units. Such polymer or copolymer is particularly high in heat resistance so is preferable as a sliding material.

Above all, wholly aromatic polyesters containing such hydroxybenzoyl groups are preferred.

As examples of the above polymer which forms an optically anisotropic melt phase there are mentioned wholly aromatic polyesters and polyester ethers, and the following are mentioned as components thereof:

(A) at least one of aromatic dicarboxylic acids and alicyclic dicarboxylic acids;

(B) at least one of aromatic hydroxycarboxylic acids;

(C) at least one of aromatic diols, alicyclic diols and aliphatic diols;

(D) at least one of aromatic dithiols, aromatic thiophenols and aromatic thiolcarboxylic acids; and (E) at least one of aromatic hydroxyamines and aromatic diamines.

In some case these compounds are each used alone, but in many cases they are used in combination, for example like (A)-(C), (A)-(D), (A)-(B)-(C), (A)-(B)-(E), or (A)-(B)-(C)-(E).

As examples of the above aromatic dicarboxylic acids (A1) there are mentioned such aromatic dicarboxylic acids as terephthalic acid, 4,4'-diphenyldicarboxylic acid, 4,4'-triphenyldicarboxylic acid, 2,6-naphthalenedicarboxylic acid, 1,4-naphthalenedicarboxylic acid, 2,7-naphthalenedicarboxylic acid, diphenyl ether-4,4'-dicarboxylic acid, diphenoxyethane-4,4'-dicarboxylic acid, diphenoxybutane-4,4'-dicarboxylic acid, diphenylethane-4,4'-dicarboxylic acid, isophthalic acid, diphenylether-3,3'-dicarboxylic acid, diphenoxyethane-3,3'-dicarboxylic acid, diphenylethane-3,3'-dicarboxylic acid, and 1,6-naphthalenedicarboxylic acid, as well as alkyl-, alkoxy- or halogen-substituted derivatives thereof such as chloroterephthalic acid, dichloroterephthalic acid, bromoterephthalic acid, methylterephthalic acid, dimethylterephthalic acid, ethylterephthalic acid, methoxyterephthalic acid, and ethoxyterephthalic acid.

As examples of the alicyclic dicarboxylic acids (A2) there are mentioned such alicyclic dicarboxylic acids as trans-1,4-cyclohexanedicarboxylic acid, cis-1,4-cyclohexanedicarboxylic acid, and 1,3-cyclohexanedicarboxylic acid, as well as alkyl-, alkoxy- or halogen-substituted derivatives thereof such as trans-1,4'-(2-methyl) cyclohexamedicarboxylic acid and trans-1,4-(2-chloro) cyclohexanedicarboxylic acid.

As examples of the aromatic hydroxycarboxylic acids (B) there are mentioned such aromatic hydroxycarboxylic acids as 4-hydroxybenzoic acid, 3-hydroxybenzoic acid, 6-hydroxy-2-naphthoic acid, and 6-hydroxy-1-naphthoic acid, as well as alkyl-, alkoxy-, or halogen-substituted derivatives thereof such as 3-methyl-4-hydroxybenzoic acid, 3,5-dimethyl-4-hydroxybenzoic acid, 2,6-dimethyl-4-hydroxybenzoic acid, 3-methoxy-4-hydroxybenzoic acid, 3,5-dimethoxy-4-hydroxybenzoic acid, 6-hydroxy-5-methyl-2-naphthoic acid, 6-hydroxy-5-methoxy-2-naphthoic acid, 2-chloro-4-hydroxybenzoic acid, 3-chloro-4-hydroxyaminebenzoic acid, 2,3-dichloro-4-hydroxybenzoic acid, 3,5-dichloro-4-hydroxybenzoic acid, 2,5-dichloro-4-hydroxybenzoic acid, 3-bromo-4-hydroxybenzoic acid, 6-hydroxy-5-chloro-2-naphthoic acid, 6-hydroxy-7-chloro-2-naphthoic acid, and 6-hydroxy-5,7-dichloro-2-naphthoic acid.

As examples of the aromatic diols (C1) there are mentioned such aromatic diols as 4,4'-dihydroxydiphenyl, 3,3-dihydroxydiphenyl, 4,4'-dihydroxytriphenyl, hydroquinone, resorcin, 2,6-naphthalenediol, 4,4'-dihydroxydiphenyl ether, bis (4-hydroxyphenoxy) ethane, 3,3'-dihydroxydiphenyl ether, 1,6-naphthalenediol, and 2,2'-bis (4-hydroxyphenyl) propanebis (4-hydroxyphenyl) methane, as well as alkyl-, alkoxy-, or halogen-substituted derivatives thereof such as chlorohydroquinone, methylhydroquinone, t-butylhydroquinone, phenylhydroquinone, methoxyhydroquinone, phenoxyhydroquinone, 4-chlororesorcin, and 4-methylresorcin.

As examples of the alicyclic diols (C2) there are mentioned such alicyclic diols as trans-1,4-cyclohexanediol, cis-1,4-cyclohexanediol, trans-1,4-cyclohexanedimethanol, cis-1,4-cyclohexanedimethanol, trans-1,3-cyclohexanediol, cis-1,2-cyclohexanediol, and trans-1,3-cyclohexanedimethanol, as well as alkyl-, alkoxy- or halogen- substituted derivatives thereof such as trans-1,4-(2-methyl) cyclohexanediol and trans-1,4-(2-chloro) cyclohexanediol.

As examples of the aliphatic diols (C3) there are mentioned such straight chain or branched aliphatic diols as ethylene glycol, 1,3-propanediol, 1,4-butanediol, and neopentyl glycol.

As examples of the aromatic dithiols (D1) there are mentioned benzene-1,4-dithiol, benzene-1,3-dithiol, 2,6-naphthalene-dithiol, and 2,7-naphthalene-dithiol.

As examples of the aromatic thiophenols (D2) there are mentioned 4-mercaptophenol, 3-mercaptophenol, and 6-mercaptophenol.

As examples of the aromatic thiocarboxylic acids (D3) there are mentioned 4-mercaptobenzoic acid, 3-mercaptobenzoic acid, 6-mercapto-2-naphthoic acid, and 7-mercapto-2-naphthoic acid.

As examples of the aromatic hydroxyamines and aromatic diamines (E) there are mentioned 4-aminophenol, N-methyl-4-aminophenol, 1,4-phenylenediamine, N-methyl-1,4-phenylenediamine, N,N'-dimethyl-1,4-phenlenediamine, 3-aminophenol, 3-methyl-4-aminophenol, 2-chloro-4-aminophenol, 4-amino-1-naphthol, 4-amino-4'-hydroxydiphenyl, 4-amino-4'-hydroxydiphenyl ether, 4-amino-4'-hydroxydiphenylmethane, 4-amino-4'-hydroxydiphenyl sulfide, 4,4'-diaminophenyl sulfide (thiodianiline), 4,4'-diaminodiphenyl sulfone, 2,5-diaminotoluene, 4,4'-ethylenedianiline, 4,4'-diaminodiphenoxyethane, 4,4'-diaminodiphenylmethane (methylenedianiline), and 4,4'-diaminodiphenyl ether (hydroxyaniline).

Wholly aromatic polyesters generally indicate polyesters obtained substantially from aromatic carboxylic acids and aromatic alcohols, but examples of the wholly aromatic polyester used in the present invention include those wherein the segment portion not forming an anisotropic melt phase is constituted by an ester of an aliphatic or alicyclic acid or alcohol. Also as to polyesters per se or segments forming an anisotropic melt phase, there are included polymers wherein they are constituted by an ester of an aliphatic or alicyclic acid or The following are concrete examples of wholly aromatic polyesters employable in the invention:

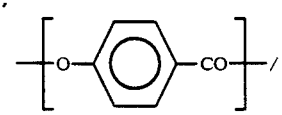

I)

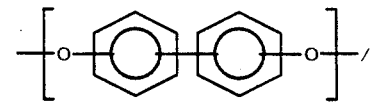

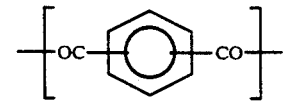

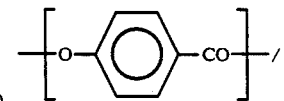

II)

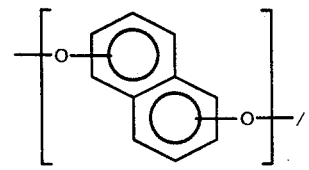

-continued

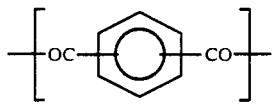

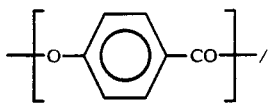 III)

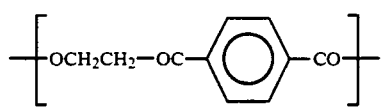

The glassy carbon used in the present invention has a random layer structure as a basic structure wherein the crystal size is extremely small, and has an unoriented texture as a fine texture. It is prepared by carbonizing a thermosetting resin such as, for example, phenolic resin, furan resin, epoxy resin, unsaturated polyester resin, urea resin, melamine resin, alkyd resin, or xylene resin, at a high temperature.

The glassy carbon is characterized in that a fracture a surface thereof has a glassy luster. It is identified also by having a wide peak in the vicinity of a spectral diffraction angle ($2\theta$) of $23°-25°$ as measured according to a conventional X-ray diffractometry using Cu-K$\alpha$ ray (double ray).

Conventional carbon materials do not have such wide peak. For example, graphite exhibits a sharp peak $d_{002}$ at another diffraction angle ($2\theta = 26.4°$) which is attributable to the crystallinity thereof. It is desirable for the glassy carbon used in the present invention substantially not to have such peak characteristic of graphite. In a carbonized product of a mere organic substance, its fractures surface does not have a glassy luster, and of course, in its X-ray diffraction spectrum it has neither of the foregoing peaks at specific diffraction angles characteristic of the glassy carbon and graphite.

Even as to glassy carbons characterized by a fracture surface having a glassy luster, they differ in properties, depending on the kind of and how to prepare starting resins, shape of starting particles, carbonization temperature and time, kind of atmosphere gas, carbonization pressure, and other conditions for carbonization. In other words, they are different in the content and properties of incompletely carbonized substance or uncarbonized substance contained therein.

On the other hand, in the present invention, in view of the fact that the glassy carbon is incorporated in a high melting, thermotropic liquid crystalline polymer, as mentioned above, it is important to use a spherical glassy carbon which exhibits a loss in weight of not more than 5 wt % under conditions peculiar to the said liquid crystalline polymer.

The "loss in weight" is defined to be a loss in weight as measured after heating from room temperature up to 350° C. at a rate of 10° C./min and holding at that temperature for 30 minutes, using a thermobalance for example as a measuring device.

In the present invention, the loss in weight is not more than 10 wt %, preferably not more than 5 wt %. If the loss in weight of the glassy carbon under the above conditions is larger than 10 wt %, then when combined with the thermotropic liquid crystalline polymer as a high melting polymer used in the invention, gas will be evolved by heating in molding, which is presumed to be because of decomposition of uncarbonized thermosetting resin, resulting in difficult molding, deteriorated appearance of the resulting molded product, or blister, thus leading to deteriorated productivity and commercial value.

As to the shape of the glassy carbon, a spherical shape is preferred a true sphere. A spherical shape, e.g. amorphous, is not desirable because it will cause wear of a mating material such as metal or resin used in a sliding part.

The average particle diameter of the glassy carbon of the present invention is within the range of $0.1 \sim 500$ $\mu$m, preferably $0.5 \sim 100$ $\mu$m.

The amount of such sphercail glassy carbon used is in the range of 10 to 70 wt %, preferably 10-50 wt %, more preferably 25-40 wt %. Within this range there is attained a sufficient abrasion resistance and the effects of the present invention can be exhibited.

If the amount of the spherical glassy carbon used is smaller than 10 wt %, the abrasion resistance will be unsatisfactory, and even if it exceeds 70 wt %, it is impossible to expect a further improvement in abrasion resistance; besides, the strength of the resulting molded product will be deteriorated.

Various additives may be incorporated in the composition of the present invention. Examples of additives include inorganic and organic fillers, stabilizers, ultraviolet ray absorbers, pigments, dyes, and modifiers. Particularly, inorganic fillers are important and often used for the improvement of processability and physical properties.

As examples of inorganic fillers there are mentioned graphite, molybdenum disulfide, bronze, talc, mica, clay, sericite, calcium carbonate, calcium silicate, calcium phosphate, calcium pyrophosphate, silica, alumina, aluminum hydroxide, calcium hydroxide, graphite fluoride, and potassium titanate. Also as to glass fibers, carbon fibers and various whiskers, these may be added in the range not impairing the effects of the present invention. Particularly preferred is graphite.

As to graphite, both artificial and natural graphites exhibit good effects irrespective of their kind, shape such as soil-like or scaly, and particle size. The amount of graphite used is in the range of 3 to 40 wt %, preferably 3 to 20 wt %. If it is smaller than 3%, there will not be attained the effect of preventing the wear of a mating member, and even if graphite is used in an amount exceeding 40 wt %, there will not be attained any further improvement effect and rather a deteriorate mechanical strength will result.

More specifically, in the case where graphite is incorporated in the composition of the present invention, the composition comprises (a) 87-40 wt % of the thermotropic liquid crystalline polymer, (b) 10-50 wt % of the spherical glassy carbon characterized by a particle fracture surface thereof having a glassy luster and exhibiting a loss in weight of not more than 10 wt %, preferable not more than 5 wt %, when held in air at 350° C. for 30 minutes, and (c) 3-40 wt % of the graphite, provided the total of the components (a), (b) and (c) is 100 wt %.

As examples of organic fillers employable in the invention there are mentioned various thermoplastic or thermosetting resins. Fluorocarbon resins are particularly preferred.

The average particle diameter of the graphite of the present invention is within the range of 0.1~500 μm, preferably 0.5~100 μm.

Examples of fluorocarbon resins employable in the present invention include polytetrafluoroethylene (PTFE), PFA which is a copolymer of tetrafluoroethylene and perfluoroalkylvinyl ether, FEP which is a copolymer of tetrafluoroethylene and hexafluoropropylene, EPE which is a copolymer of tetrafluoro-ethylene, hexafluoropropylene and perfluorovinyl ether, ETFE which is a copolymer of ethylene and tetrafluoroethylene, and modified type resins of these fluorocarbon resins. Particularly preferred is PTFE.

In the case where a fluorocarbon resin is incorporated in the composition of the present invention, the composition comprises (a) 87-40 wt % of the thermotropic liquid crystalline polymer, (b) 10-50 wt % of the spherical glassy carbon characterized by a particle fracture surface thereof having a glassy luster and exhibiting a loss in weight of not more than 10 wt %, preferably not more than 5 wt %, when held in air at 350° C. for 30 minutes, and (c) 3-20 wt % of the fluorine resin, provided the total of the components (a), (b) and (c) is 100 wt %.

If the amount of the fluorocarbon resin used is smaller than 3 wt %, it will not be effective in preventing the wear of a mating material, and even if it exceeds 20 wt %, there will not be attained any further improvement effect, rather causing deterioration in mechanical strength of the resulting molded product.

How to mix the thermotropic liquid crystalline polymer, the spherical glassy carbon and the additive just exemplified above is not specially limited. Various means are applicable.

For example, they may be fed separately to an extruder for melt-mixing, or they may be pre-mixed in a mixing machine, e.g. Henschel mixer or tumbler, and then fed as a mixture to an extruder.

The particles of the glassy carbon used in the invention may be added at the time of polymerization of the thermotropic liquid crystalline polymer. Even in a thermotropic liquid crystalline polymer composition wherein the glassy carbon was incorporated at the time of such polymerization, the thermotropic liquid crystalline polymer is melt-molded and thus exposed to a high temperature in the case of producing a processed product from the composition, that is, in the case of subjecting the composition to molding such as injection molding or compression molding. Also in this case, therefore, the effects of the present invention can be attained.

The composition of the present invention thus obtained is then molded, for example by injection molding, compression molding, or extrusion. In the case of compression molding, the components may be dry-blended in a powdered form, followed by molding.

Since the composition of the present invention has superior sliding property and abrasion resistance, it is applied to various uses. Particularly, it is preferably used as a sealing member in a scroll type compressor or vacuum pump. More specifically, it is important that a sealing member fitted in end faces of a pair of scroll members disposed in mesh with each other in a scroll type compressor or vacuum pump be formed from the resin composition in the first aspect of the present invention. Preferably, such sealing member is formed using a composition comprising (a) 90-50 wt % of a thermotropic liquid crystalline polymer containing at least a monomer unit represented by the foregoing formula (1) and (b) 10-50 wt % of a spherical glassy carbon characterized by a particle fracture surface thereof having a glassy luster and exhibiting a loss in weight of not more than 5 wt % when held in air at 350° C. for 30 minutes. The amount of the spherical glassy carbon is in the range of 10 to 50 wt %, preferably 25 to 40 wt %. Within this range there is obtained a sufficient abrasion resistance and the effects of the present invention can be exhibited.

If the amount of the spherical glassy carbon is smaller than 10 wt %, the abrasion resistance will be unsatisfactory, and even if it exceeds 50 wt %, it will be impossible to expect a further improvement in abrasion resistance, and the moldability will be deteriorated, further resulting in deteriorated strength of the resulting molded product.

The internal temperature of the compressor or the vacuum pump will rise to 200° C. or so due to frictional heat induced by the rotation of scrolls or due to the generation of heat by the compression of gas. But this level of temperature causes no problem for the thermotropic liquid crystalline polymer which exhibits high heat resistance.

In a sliding part there often is used a lubricating oil as a lubricant, which is inert at room temperature, but sometimes exhibits corrosiveness to contacting members at a high temperature based on frictional heat. Moreover, in the compressor, the resistance to chemicals is required because of exposure to chemicals, e.g. fron gas. The resin composition of the present invention comprising the thermotropic liquid crystalline polymer and the glassy carbon is fully resistant to chemicals at high temperatures, so is not corroded by lubricating oil or other chemicals even in a high temperature atmosphere in the case where the lubricating oil is used in a sliding part.

Further, by applying a shear force to the thermotropic liquid crystalline polymer during melting, molecular chains thereof are oriented in the shearing direction, thus exhibiting an extremely good fluidity, so it is sufficiently possible to subject it to injection molding even in the production of an production of an elongated molded product having a small sectional area like the sealing member according to the present invention.

Besides, since the polymer assumes the state of crystals already at the time of melt flow, there is little structural change or change in specific volume at the time of cooling to solidify in a mold, resulting in that the mold shrinkage factor is small and hence precision molding can be done easily.

Additionally, since the molecules are highly oriented to form a rigid molecular chain, the coefficient of linear expansion is small and a high processing accuracy can be maintained over a wide temperature range.

The composition of the present invention is employable also in the production of electrical articles, office supplies, shafts and bearings of power machinery and devices, various gears, cams, bearings, guide rolls for video tape and cassette tape, sealing members such as end face material of mechanical seal, valve seat, V ring, rod packing, piston ring and rider ring, compressor's rotary shaft, rotary sleeve, piston, impeller, vane, rotor and roller, separator pawl in copying machines, and rotating mechanical parts.

EFFECTS OF THE INVENTION

Since the composition of the present invention has the following characteristic features, it is suitable as a sliding material for use in a sliding part at high load and speed wherein a mating material is a metal.

(1) Among the conventional plastics, the polymer used in the present invention is particularly high in melting point, so seldom melts or seizes even under frictional heat.

(2) The composition is little worn because of using a specific glassy carbon, and scarcely damages a metallic material, e.g. iron of steel, as a mating member in a sliding part.

(3) Because of using a thermotropic liquid crystalline polymer, the composition of the present invention is superior in melt fluidity though high in melting point, so the injection molding thereof is easy.

(4) At a high temperature based on frictional heat, a lubricating oil or fron gas which usually ought to be inert sometimes exhibits corrosiveness to a member which comes into contact therewith. But the composition of the present invention is stable even to them, so is suitable as a sliding material.

(5) The sealing member according to the present invention exhibits an excellent heat resistance even in a high temperature atmosphere during the operation of a compressor or a vacuum pump, so a superior sealing property is ensured.

EXAMPLES

Examples will be described below to illustrate the present invention in more detail, but it is to be understood that examples show suitable modes of embodiment of the present invention and not intended to restrict the scope of the invention.

The following materials were used in the following Examples and Comparative Examples:

① Thermotropic Liquid Crystalline Polymer

A: Powdered, thermotropic liquid crystalline polymer which is a terpolymer (molar ratio=1:2:1) of terephthalic acid, 4-acid and 4,4'-dihydroxydiphenyl. m.p. 420° C.

B: Powdered, thermotropic liquid crystalline polymer which is a quaternary polymer (molar ratio=1:1:2:2) of terephthalic acid, isophthalic acid, 4-hydroxybenzoic acid and 4,4'-dihydroxydiphenyl. m.p. 350° C.

② Polyallylene Sulfide Resin

PPS resin (RYTON P-4, a product of Phillips Petroleum International, U.S.A.).

③ Aromatic Polyether Ketone Resin

PEEK resin (VICTREX PEEK450G, a product of ICI, Great Britain).

④ Spherical Glassy Carbon

The following A to D are spherical glassy carbons obtained by calcining for carbonization of thermosetting resins:

| A: BELL PEARL C-800 | (trade name) |
| B: UNIVEKS GCP-50 (H) | (trade name) |
| C: BELL PEARL C-2000 | (trade name) |
| D: UNIVEKS GCP-50 (L) | (trade name) |
| BELL PEARL | a product of Kanebo, Ltd. |
| UNIVEKS | a product of Unitika Ltd. |

The respective losses in weight and average particle diameters are as follows:

| | |
|---|---|
| A: | loss in weight 1.2%, average particle diameter 10 μm |
| B | loss in weight 0.5%, average particle diameter 30 μm |
| C: | loss in weight 0.2%, average particle diameter 10 μm or less |
| D: | loss in weight 5.1%, average particle diameter 30 μm |

All of the above glassy carbons clearly proved to have a glassy luster on a fracture surface of each carbon particle and also have a wide peak near a diffraction angle ($2\theta$) of 23°–25° in an X-ray diffraction spectrum as measured using Cu-K$\alpha$ ray (double ray). A sharp peak peculiar to graphite was not recognized in the glassy carbon particles A, B and D, but in the carbon C there was recognized $d_{002}$ peak shoulderwise at a diffraction angle $2\theta=$ of 26.4°.

Loss in weight:

The loss in weight was measured after raising the temperature from room temperature up to 350° C. at a rate of 10° C./min and subsequent holding at this temperature for 30 minutes (using a thermobalance SSC-5020 TG/DTA200, a product of Seiko Instruments Inc.

⑤ Graphite

ACP (trade name), a scaly graphite, average particle diameter: 10 μm, a product of Nippon Graphite Industries Ltd.

⑥ Glass Fiber

Milled glass fiber MFA, diameter: 10–15 μm, average length: 30–100 μm, a product of Asahi Fiber Glass Ltd.

⑦ Fluorocarbon Resin

Polytetrafluoroethylene, luburon L 5 (trade name), a product of Daikin Industries, Ltd, average particle diameter: 5 μm.

EXAMPLE 1

Materials referred to above were mixed in the proportions shown in Table 1 using a Henschel mixer, then the mixture was melt-kneaded in a twin-screw extruder (PCM-45, a product of Ikegai Iron Works, Ltd.) (temperature: 420° C., screw speed: 200 rpm) and formed into pellets.

Then, the pellets were formed into a disc 5 cm in diameter and 3 mm in thickness using an injection molding machine (IS80EPN-3Y, a product of Toshiba Machine Co., Ltd.) under the conditions of cylinder temperature 410° C., injection pressure 1000 kgf/cm$^2$ and mold temperature 180° C. The test piece thus obtained was measured for wear factor and there was measured the depth of wear of a mating material which was a ring-like S45C steel having an outside diameter of 25.6 mm and an inside diameter of 20 mm, under the conditions of pressure 5 kgf/cm$^2$, speed 20 m/min, 2 hours, using a Suzuki type frictional wear tester.

Further, a bending test piece was formed using the above injection molding machine and under the same conditions as above and then measured for bending strength according to ASTM D-790. At the same time, ten test pieces were observed for moldability and appearance. Also in the following, ten test pieces were used for the observation of moldability and appearance.

EXAMPLE 2

Materials referred to above were used in the proportions shown in Table 1 and formed into a disc 5 cm in diameter and 3 mm in thickness under the same conditions as in Example 1 except that the temperature of the twin-screw extruder was 350° C., the cylinder temperature of the injection molding machine was 360° C. and the mold temperature was 150° C. The disc was then measured for wear characteristics in the same way in Example 1.

Further, a bending test piece was formed using the injection molding machine and under the same conditions as above, then measured for bending strength according to ASTM D-790. At the same time, moldability and appearance were observed.

EXAMPLE 3

Using materials referred to above in the proportions shown in Table 1, pellets were formed under the same conditions as in Example 1. The pellets were then compression-molded at a pressure of 200 kgf/cm$^2$ into a test piece having a thickness of 3 mm and a size of 50×50 mm. Then, the test piece was evaluated for wear characteristics in the same way as above.

Further, a flat plate having a thickness of 3 mm and a size of 100×100 mm was formed, from which was cut out a test piece having a width of 12.7 mm and a length of 100 mm. Then, the test piece was measured for bending strength according to ASTM D-790. At the same time, moldability and appearance were observed.

EXAMPLE 4

Using materials referred to above in the proportions shown in Table 1, pellets were formed under the same conditions as in Example 1 except that the temperature of the twin-screw extruder was 350° C. The pellets were then compression-molded at a temperature of 360° C. and a pressure of 200 kgf/cm$^2$ to form a test piece having a thickness of 3 mm and a size of 50×50 mm. Then, the test piece was evaluated for wear characteristics in the same manner as above.

Further, a flat plate having a thickness of 3 mm and a size of 100×100 mm was formed, from which was cut out a test piece having a width of 12.7 mm and a length of 100 mm. This test piece was measured for bending strength according to ASTM D-790. At the same time, moldability and appearance were observed.

The results obtained are as set forth in Table 1.

The bending test pieces obtained in Examples 1-4 were placed in a pressure-resisting container having a capacity of 500 cc together with 150 ml of a lubricating oil, SUNISO 4G Oil (trade name), then the container was sealed. Further, 500 g of fron gas S-3 was introduced into the container under cooling. Then, the container was immersed in silicone oil at 165° C. for 48 hours. After cooling for 4 hours, the gas was removed and the samples were taken out and observed for a dimensional change in the longitudinal direction and a change in weight.

None of the bending test pieces changed in size and weight, proving that the compositions each comprising a thermotropic liquid crystalline polymer and a glassy carbon were superior in the resistance to chemicals.

COMPARATIVE EXAMPLES 1 AND 4

Materials referred to above were mixed in the proportions shown in Table 2, followed by the formation of pellets, discs and bending test pieces in the same way as in Example 1, which were then evaluated. The results obtained are as set forth in Table 2.

COMPARATIVE EXAMPLE 2

Materials referred to above were mixed in the proportions shown in Table 2, followed by the formation of pellets, discs and bending pieces in the same way as in Example 2, which were then evaluated. The results obtained are as set forth in Table 2.

COMPARATIVE EXAMPLES 3, 5 AND 6

Materials referred to above were mixed in the proportions shown in Table 2, followed by the formation of pellets and flat plates in the same way as in Example 4, which were then evaluated. The results obtained are as set forth in Table 2.

In each of Examples 1 to 4, the ratio of the thermotropic liquid crystalline polymer and the spherical glassy carbon used and the loss in weight of the glassy carbon at 350° C. are within desirable ranges, so all of wear characteristics, mechanical strength, moldability and the appearance of the molded products are superior.

On the other hand, in Comparative Examples 1–3, although there were used graphite so far used for the improvement of sliding property and abrasion resistance and glass fiber, the wear factor is large, and in the case of the glass fiber the depth of wear of the mating material is also large. Particularly, in point of wear of the mating material, a marked difference is recognized in the use of soft aluminum.

In Comparative Example 4, the abrasion resistance is unsatisfactory because the amount of the spherical glassy carbon used is smaller than 10 wt %, and in Comparative Example 5 the mechanical strength is unsatisfactory because the amount of the spherical glassy carbon used exceeds 70 wt %.

Further, in Comparative Example 6, the loss in weight of the glassy carbon in air at 350° C. exceeded 5 wt %, resulting in that the evolution of gas badly influenced moldability and the appearance of the molded product; the evolution of gas made it impossible to effect molding.

EXAMPLES 5-7

Materials referred to above were mixed in the proportions shown in Table 3 using a Henschel mixer and then the mixture was melt-kneaded in a twin-screw extruder (PCM-30, a product of Ikegai Iron Works, Ltd.) (temperature: 420° C., screw speed: 200 rpm) to form pellets.

The pellets thus obtained were formed into discs each having a diameter of 5 cm and a thickness of 3 mm under the conditions of cylinder temperature 400° C., injection pressure 1000 kgf/cm$^2$ and mold temperature 150° C., using an injection molding machine (NETSTAL SG 25, a product of Sumitomo Heavy Industries, Ltd.). Then, using a Suzuki type frictional wear tester, the test pieces thus obtained were measured for wear factor and there was measured the depth of wear of mating materials which were ring-like S45C steel and aluminum having an outside diameter of 25.6 mm and an inside diameter of 20 mm.

Further, using the foregoing injection molding machine, bending test pieces were formed under the same conditions as above, which were then measured for bending strength according to ASTM D-790.

EXAMPLE 8

Using materials referred to above in the proportions shown in Table 3, a disc having a diameter of 5 cm and a thickness of 3 mm was formed under the same conditions as in Example 7 except that the temperature of the twin-screw extruder was 350° C., the cylinder temperature of the injection molding machine was 340° C. and the mold temperature was 80° C. The disc was then measured for wear characteristics in the same way as in Example 5.

Further, a bending test piece was formed using the foregoing injection molding machine and under the same conditions as above, then it was measured for bending strength according to ASTM D-790.

EXAMPLE 9

Using materials referred to above in the proportions shown in Table 3, pellets were formed under the same conditions as in Example 5 except that the temperature of the twin-screw extruder was 420° C.

The pellets were then compression-molded at a temperature of 420° C. and a pressure of 200 kgf/cm$^2$ to obtain a test piece having a thickness of 3 mm and a size of 50×50 mm, which was then evaluated for wear characteristics in the same manner as in Example 5.

Further, a flat plate having a thickness of 3 mm and a size of 100×100 mm was formed, from which was then cut out a test piece having a width of 12.7 mm and a length of 100 mm. The test piece thus obtained was measured for bending strength according to ASTM D-790.

EXAMPLES 10 AND 11

Using materials referred to above in the proportions shown in Table 3, pellets were formed under the same conditions as in Example 5 except that the temperature of the twin-screw extruder was 350° C. The pellets were then compression-molded at a temperature of 360° C. and a pressure of 200 kgf/cm$^2$ to obtain test pieces each having a thickness of 3 mm and a size of 50×50 mm, which were then evaluated for wear characteristics in the same way as in Example 5.

Further, flat plates having a thickness of 3 mm and a size of 100×100 mm were formed, from which were cut out test pieces having a width of 12.7 mm and a length of 100 mm. The test pieces thus obtained were measured for bending strength according to ASTM D-790.

The results obtained are as set forth in Table 3.

The bending test pieces obtained in Examples 5-11 were checked for the resistance to chemicals. None of them changed in size and weight, proving that each of the compositions comprising the thermotropic liquid crystalline polymer, glassy carbon and graphite was superior in chemicals resistance.

COMPARATIVE EXAMPLES 7 AND 8

Materials referred to above were mixed in the proportions shown in Table 4, followed by the formation of pellets, discs and bending test pieces in the same manner as in Examples 5-7, which were then evaluated. The results obtained are as set forth in Table 4.

COMPARATIVE EXAMPLE 9

Materials referred to above were mixed in the proportions shown in Table 4, followed by the formation of pellets, discs and bending test pieces in the same manner as in Example 8, which were then evaluated. The results obtained are as set forth in Table 4.

COMPARATIVE EXAMPLES 10-12

Materials referred to above were mixed in the proportions shown in Table 4, followed by the formation of pellets and flat plates in the same manner as in Examples 10 and 11, which were then evaluated. The results obtained are as set forth in Table 4.

In each of Examples 5 to 11, the ratio of the thermotropic liquid crystalline polymer, spherical glassy carbon and graphite is within a desirable range, so both wear characteristics and mechanical strength are superior.

On the other hand, in Comparative Examples 7, 8, 10 and 11, the wear factor and the depth of wear of the mating material are both large because graphite is not contained in the compositions prepared therein. Particularly, a marked difference is recognized in the case where the mating material is soft aluminum. In Comparative Example 9 the abrasion resistance is unsatisfactory because the amount of the spherical glassy carbon used was smaller than 10 wt %. Further, in Comparative Example 12, the mechanical strength is unsatisfactory because the amount of the thermotropic liquid crystalline polymer used was smaller than 30 wt %.

EXAMPLES 12 AND 13

Using materials referred to above in the proportions shown in Table 5, discs each having a diameter of 5 cm and a thickness of 3 mm were formed under the same conditions as in Example 5. The test pieces thus obtained were measured for wear factor and there was measured the depth of wear of mating materials which were ring-like S45C steel and aluminum having an outside diameter of 25.6 mm and an inside diameter of 20 mm, under the conditions of pressure 6 kgf/cm$^2$, speed 120 m/min, 1 hour, using a Suzuki type frictional wear tester.

Further, bending test pieces were formed using the foregoing injection molding machine and under the same conditions as above, then measured for bending strength according to ASTM D-790.

EXAMPLES 14 AND 15

Using materials referred to above in the proportions shown in Table 5, discs each having a diameter of 5 cm and a thickness of 3 mm were formed under the same conditions as in Example 5 except that the cylinder temperature of the twin-screw extruder and that of the injection molding machine were 350° C. and 340° C., respectively, and the mold temperature was 80° C., and then measured for wear characteristics in the same manner as in Examples 12 and 13.

Further, bending test pieces were formed using the foregoing injection molding machine and under the same conditions as above, and then measured for bending strength according to ASTM D-790.

EXAMPLE 16

Using materials referred to above in the proportions shown in Table 5, pellets were formed under the same conditions as in Example 5. The pellets thus obtained were then compression-molded at a temperature of 420° C. and a pressure of 200 kgf/cm$^2$ to obtain a test piece having a thickness of 3 mm and a size of 50×50 mm, which was then evaluated for wear characteristics in the same way as in Example 5.

Further, a flat plate having a thickness of 3 mm and a size of 100×100 mm was formed, from which was cut out a test piece having a width of 12.7 mm and a length of 100 mm. The test piece thus obtained was then measured for bending strength according to ASTM D-790.

EXAMPLES 17 AND 18

Using materials referred to above in the proportions shown in Table 5, pellets were formed under the same conditions as in Example 5 except that the cylinder temperature of the twin-screw extruder was 350° C. The pellets thus obtained were then compression-molded at a temperature of 360° C. and a pressure of 200 kgf/cm$^2$ to obtain test pieces each having a thickness of 3 mm and a size of 50×50 mm, which were then evaluated for wear characteristics in the same manner as in Example 5.

Further, flat plates each having a thickness of 3 mm and a size of 100×100 mm were formed, from which were then cut out test pieces each having a width of 12.7 mm and a length of 100 mm. The test pieces thus obtained were measured for bending strength according to ASTM D-790.

The results obtained are as set forth in Table 5.

The bending test pieces obtained in Examples 12–15 were checked for the resistance to chemicals in the same way as in Examples 1–4. None of the test pieces changed in size and weight, proving that the compositions each comprising the thermotropic liquid crystalline polymer, glassy carbon and fluorine resin were superior in chemicals resistance.

COMPARATIVE EXAMPLE 13

Materials referred to above were mixed in the proportions shown in Table 6, followed by the formation of pellets, disc and bending test piece in the same manner as in Examples 16 and 17, which were then evaluated. The results obtained are as set forth in Table 6.

COMPARATIVE EXAMPLE 14

Materials referred to above were mixed in the proportions shown in Table 6, followed by the formation of pellets and a flat plate in the same manner as in Example 16, which plate was then evaluated. The results obtained are as set forth in Table 6.

EXAMPLE 15

Materials referred to above were mixed in the proportions shown in Table 6, followed by the formation of pellets and a flat plate in the same way as in Examples 17 and 18, which plate was then evaluated. The results obtained are as set forth in Table 6.

In Examples 12–18, both wear characteristics and mechanical strength are superior because in each of them the ratio of thermotropic liquid crystalline polymer, spherical glassy carbon and fluorine resin is in a desirable range.

In each of Comparative Examples 13 and 14 the abrasion resistance is unsatisfactory because the amount of the spherical glassy carbon used is smaller than 10 wt %. In Comparative Example 15, the mechanical strength is unsatisfactory because the amount of the thermotropic liquid crystalline polymer used is less than 40 wt %.

EXAMPLES 19–22

Using materials referred to above in the proportions shown in Table 7, an experiment was conducted under the same conditions as in Example 1, and physical properties were checked.

At the same time, ten test pieces obtained in a continuous manner were observed for appearance, and the number of blister and that of flow mark were checked. Also, the same test pieces were checked for chemicals resistance in the same way as in Examples 1–4.

Next, using an injection molding machine (NETSTAL SG25, a product of Sumitomo Shipbuilding & Machinery Co., Ltd.), a chip seal member show in FIG. 1 was formed by injection molding through a pinpoint gate of 0.4 mm diameter from the position indicated at 2 at a cylinder temperature of 400° C., an injection pressure of 1500 kgf/cm$^2$ and a mold temperature of 150° C., and checked for moldability.

The results obtained are as set forth in Table 7.

Figure 2:
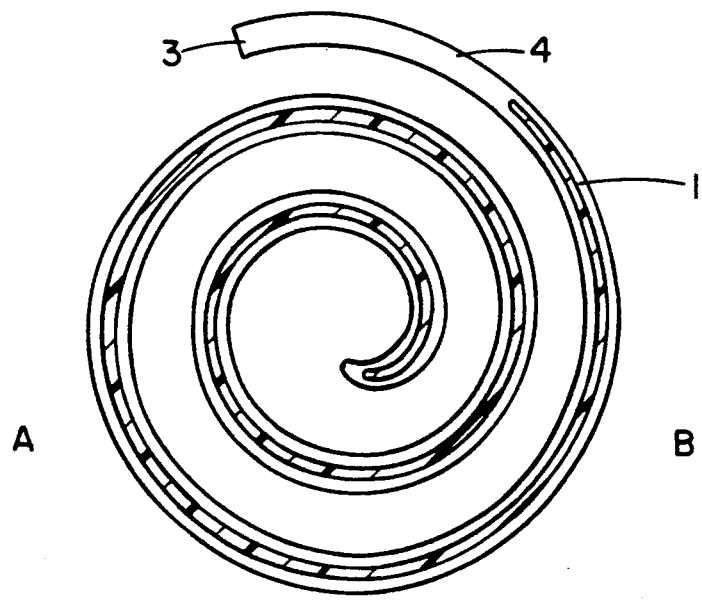
FIG. 2 is an illustrative view of an example of a scroll member equipped with a sealing member in accordance with the present invention.
Figure 3:
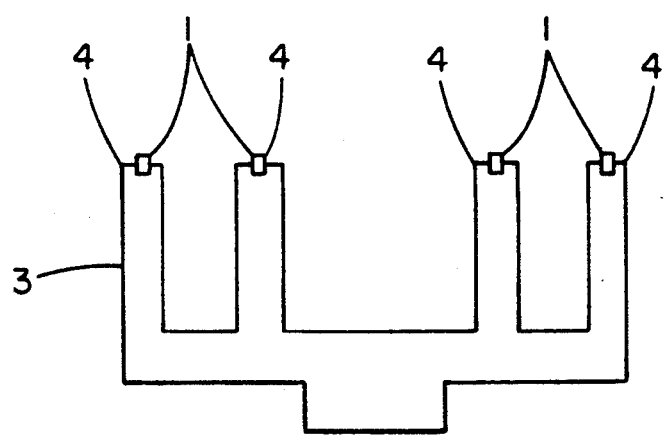
FIG. 3 is a cross-sectional view of FIG. 2 in A-B.

The sealing member shown in FIG. 1, formed above in a vortical shape, was fitted in end faces of both aluminum alloy scrolls of a scroll type compressor, as shown in FIGS. 2 and 3. The compressor was operated for six months, using a lubricating oil (trade name: SUNISO 4G Oil) in the sliding part and fron gas S-3 as compression gas. Thereafter, the sealing member was taken out and checked for the surface state, but no special change was recognized.

Also, the same vortical sealing member as that shown in FIG. 1 was fitted in end faces of both aluminum alloy scrolls of a scroll type vacuum pump. After operation of the vacuum pump for six months, using a lubricating oil (trade name: SUNISO 4G Oil) in the sliding part, the sealing member was taken out and checked for the surface state, but no special change was recognized.

COMPARATIVE EXAMPLES 16–18

Materials referred to above were mixed in the proportions shown in Table 8, followed by the formation of pellets, bending pieces, discs and chip seal members in the way as in Examples 19–22, which were then evaluated. The results obtained are as set forth in Table 8.

COMPARATIVE EXAMPLES 19 AND 20

Using a polyallylene sulfide resin and an aromatic polyether ketone resin in place of the thermotropic liquid crystalline polymer, evaluation was made in the same way as in Examples 19–22, provided the kneading of the resins with glassy carbon using the twin-screw extruder and the injection molding thereof were performed at a temperature of 320° C. in the use of the polyallylene sulfide resin and to 360° C. in the use of the aromatic polyether ketone resin. The other conditions were not changed. The results obtained are as set forth in Table 8.

From a comparison between Examples 19–22 and Comparative Examples 16–20 it is seen that in Examples 19–22 the wear factor and injection moldability are both superior because in each of them the ratio of the thermotropic liquid crystalline polymer and the glassy carbon and the loss in weight of the glassy carbon after held in air at 350° C. for 30 minutes are in desirable ranges.

On the other hand, in Comparative Example 16, the wear factor is large because the amount of the glassy carbon used was small, and in Comparative Example 17 the injection moldability and the product strength are poor because the amount of the glassy carbon used exceeded 50 wt %.

The results obtained in Comparative Example 18 show that the injection moldability and the appearance of molded product are not satisfactory in the case where the loss in weight of the glassy carbon after held in air at 350° C. for 30 minutes is outside a desirable range.

In Comparative Examples 19 and 20 there were used conventional polyallylene sulfide resin (PPS) and aromatic polyether ketone resin (PEEK) in place of the thermotropic liquid crystalline polymer, but the chemicals resistance was poor, and in the injection molding of a chip seal, the resins were not completely charged into the mold, exhibiting a short shot state, with the result that a desired molded product was not obtained.

TABLE 1

|  |  |  | Example 1 | Example 2 | Example 3 | Example 4 |
|---|---|---|---|---|---|---|
| Amount, wt % | Thermotropic liquid crystalline polymer | A | 60 | — | 70 | — |
|  |  | B | — | 70 | — | 60 |
|  | Glassy carbon | A | — | 30 | — | — |
|  |  | B | 40 | — | — | 40 |
|  |  | C | — | — | 30 | — |
| Molding Method |  |  | Injection | Injection | Compression | Compression |
| Moldability |  |  | ○ | ○ | ○ | ○ |
| Appearance of Molded Product | Number of Blister |  | 0 | 0 | 0 | 0 |
|  | Number of Flow Mark |  | 0 | 0 | — | — |
| Mating Material in Abrasion Test |  |  | S45C | Aluminum | Aluminum | S45C |
| Wear Factor | mm$^3$/kgf·km |  | $3.6 \times 10^{-3}$ | $9.9 \times 10^{-2}$ | $5.6 \times 10^{-2}$ | $6.5 \times 10^{-3}$ |
| Depth of Wear of Mating Member mg |  |  | 0.2 | 6.3 | 5.9 | 0.1 |
| Bending Strength kgf/cm$^2$ |  |  | 1200 | 1240 | 1030 | 700 |

Moldability: ○ ... Good, X ... Bad

TABLE 2

|  |  |  | Comparative Example 1 | 2 | 3 | 4 | 5 | 6 |
|---|---|---|---|---|---|---|---|---|
| Amount, wt % | Thermotropic liquid crystalline polymer | A | 70 | — | — | 95 | — | 60 |
|  |  | B | — | 55 | 55 | — | 25 | — |
|  | Glassy carbon | A | — | — | — | 5 | — | — |
|  |  | B | — | — | — | — | 75 | — |
|  |  | D | — | — | — | — | — | 40 |
|  | Graphite |  | 30 | — | — | — | — | — |
|  | Glass fiber |  | — | 45 | 45 | — | — | — |
| Molding Method |  |  | Injection | Injection | Compression | Injection | Compression | Compression |
| Moldability |  |  | ○ | ○ | ○ | ○ | ○ | X |
| Appearance of Molded Product | Number of Blister |  | 0 | 0 | 0 | 0 | 0 | — |
|  | Number of Flow Mark |  | 0 | 0 | — | 0 | — | — |
| Mating Material in Abrasion Test |  |  | S45C | Aluminum | S45C | S45C | S45C | — |
| Wear Factor | mm$^3$/kgf·km |  | $6.7 \times 10^0$ | $8.9 \times 10^0$ | $7.5 \times 10^{-1}$ | $2.1 \times 10^1$ | $5.6 \times 10^{-2}$ | — |
| Depth of Wear of Mating Member mm$^3$ |  |  | 0.1 | 18.9 | 3.1 | 0.0 | 1.8 | — |
| Bending Strength kgf/cm$^2$ |  |  | 1200 | 1600 | 1200 | 1500 | 380 | — |

Moldability: ○ ... Good, X ... Bad

TABLE 3

|  |  |  | Example 5 | 6 | 7 | 8 | 9 | 10 | 11 |
|---|---|---|---|---|---|---|---|---|---|
| Amount, wt % | Thermotropic liquid crystalline polymer | A | 50 | 70 | 67 | — | 60 | — | — |
|  |  | B | — | — | — | 50 | — | 50 | 67 |
|  | Glassy carbon | A | 40 | — | — | — | — | — | 30 |
|  |  | B | — | 20 | 30 | — | 30 | — | — |
|  |  | C | — | — | — | 30 | — | 40 | — |
|  | Graphite |  | 10 | 10 | 3 | 20 | 10 | 10 | 3 |
| Molding Method |  |  | Injection | Injection | Injection | Injection | Compression | Compression | Compression |
| Mating Material in Abrasion Test |  |  | S45C | S45C | Aluminum | Aluminum | S45C | Aluminum | S45C |
| Wear Factor | mm$^3$/kgf·km |  | $2.1 \times 10^{-2}$ | $2.8 \times 10^{-2}$ | $7.5 \times 10^{-2}$ | $6.8 \times 10^{-2}$ | $1.8 \times 10^{-2}$ | $9.1 \times 10^{-2}$ | $2.4 \times 10^{-2}$ |
| Depth of Wear of Mating Member mg |  |  | 0.1 | 0.0 | 1.4 | 0.9 | 0.0 | 0.9 | 0.2 |
| Bending Strength kgf/cm$^2$ |  |  | 990 | 1030 | 1080 | 990 | 630 | 580 | 680 |

TABLE 4

|  |  |  | Comparative Example 7 | 8 | 9 | 10 | 11 | 12 |
|---|---|---|---|---|---|---|---|---|
| Amount, wt % | Thermotropic liquid crystalline polymer | A | 60 | 70 | — | — | — | — |
|  |  | B | — | — | 62 | 70 | 60 | 25 |
|  | Glassy carbon | A | — | — | — | 30 | — | 50 |
|  |  | B | 40 | 30 | — | — | 40 | — |
|  |  | C | — | — | 8 | — | — | — |
|  | Graphite |  | — | — | 30 | — | — | 25 |
| Molding Method |  |  | Injection | Injection | Injection | Compression | Compression | Compression |
| Mating Material in Abrasion Test |  |  | S45C | Aluminum | S45C | Aluminum | S45C | S45C |
| Wear Factor | mm$^3$ |  | $7.1 \times$ | $5.6 \times$ | *abnormal | $9.9 \times$ | $8.0 \times$ | $4.5 \times$ |

TABLE 4-continued

| | Comparative Example | | | | | |
|---|---|---|---|---|---|---|
| | 7 | 8 | 9 | 10 | 11 | 12 |
| kgf · km | $10^{-2}$ | $10^{-1}$ | wear | $10^{-1}$ | $10^{-2}$ | $10^{-3}$ |
| Depth of Wear of Mating Member mg | 0.8 | 5.9 | — | 6.3 | 0.7 | 0.4 |
| Bending Strength kgf/cm$^2$ | 1050 | 1030 | 990 | 680 | 700 | 360 |

*Abnormal wear: Worn out rapidly and the operation of the apparatus stopped.

TABLE 5

| | | | Example | | | | | | |
|---|---|---|---|---|---|---|---|---|---|
| | | | 12 | 13 | 14 | 15 | 16 | 17 | 18 |
| Amount, wt % | Thermotropic liquid crystalline polymer | A | 50 | 65 | | | 60 | | |
| | | B | | | 55 | 70 | | 50 | 55 |
| | Glassy carbon | A | 40 | | | 25 | | | |
| | | B | — | 30 | 30 | — | 30 | — | — |
| | | C | — | — | — | — | — | 40 | 30 |
| | PTFE | | 10 | 5 | 15 | 5 | 10 | 10 | 15 |
| Molding Method | | | Injection | Injection | Injection | Injection | Compression | Compression | Compression |
| Mating Material in Abrasion Test | | | S45C | Aluminum | S45C | Aluminum | S45C | S45C | Aluminum |
| Wear Factor | mm$^3$ | | 4.2 × | 8.1 × | 3.0 × | 9.1 × | 2.5 × | 4.4 × | 9.8 × |
| | kgf · km | | $10^{-2}$ | $10^{-2}$ | $10^{-3}$ | $10^{-2}$ | $10^{-3}$ | $10^{-2}$ | $10^{-2}$ |
| Depth of Wear of Mating Member mg | | | 0.1 | 1.2 | 0.0 | 1.0 | 0.2 | 0.1 | 0.9 |
| Bending Strength kgf/cm$^2$ | | | 980 | 1100 | 900 | 1010 | 700 | 670 | 620 |

TABLE 6

| | | | Comparative Example | | |
|---|---|---|---|---|---|
| | | | 13 | 14 | 15 |
| Amount, wt % | Thermotropic liquid crystalline polymer | A | | 72 | |
| | | B | 82 | | 35 |
| | Glassy carbon | A | | | 50 |
| | | B | | | |
| | | C | 8 | 8 | |
| | PTFE | | 10 | 20 | 15 |
| Molding Method | | | Injection | Compression | Compression |
| Mating Material in Abrasion Test | | | S45C | Aluminum | S45C |
| Wear Factor | mm$^3$ | | 4.6 × | *abnormal | 8.5 × |
| | kgf · km | | $10^{-1}$ | wear | $10^{-2}$ |
| Depth of Wear of Mating Member mg | | | 0.2 | — | 0.4 |
| Bending Strength kgf/cm$^2$ | | | 990 | 420 | 380 |

*Abnormal wear: Worn out rapidly and the operation of the apparatus stopped.

TABLE 7

| | | | Example | | | |
|---|---|---|---|---|---|---|
| | | | 19 | 20 | 21 | 21 |
| Amount, wt % | Thermotropic liquid crystalline polymer | A | 70 | 60 | 60 | 60 |
| | Glassy carbon | B | 30 | 30 | — | — |
| | Glassy carbon | A | — | — | 40 | 30 |
| | Graphite | | — | 10 | — | — |
| | Tetrafluoroethylene resin | | — | — | — | 10 |
| Wear Factor | mm$^3$ | | 5.0 × | 2.4 × | 2.0 × | 2.8 × |
| | kgf · km | | $10^{-2}$ | $10^{-2}$ | $10^{-2}$ | $10^{-2}$ |
| Chemicals Resistance | Weight Increase % | | 0 | 0 | 0 | 0 |
| | Dimensional Change % | | 0 | 0 | 0 | 0 |
| Injection moldability | | | ◯ | ◯ | ◯ | ◯ |
| Bending Strength kgf/cm$^2$ | | | 1030 | 980 | 1020 | 1000 |
| Appearance of Molded Product | Number of Blister | | 0 | 0 | 0 | 0 |
| | Number of Flow Mark | | 0 | 0 | 0 | 0 |

Injection moldability:
◯ Good
Δ Short shot
X Drooling under foaming from nozzle

TABLE 8

| | | | Example | | | | |
|---|---|---|---|---|---|---|---|
| | | | 16 | 17 | 18 | 19 | 20 |
| Amount, wt % | Thermotropic liquid crystalline polymer | A | 92 | 45 | 70 | — | — |
| | PPS | | — | — | — | 80 | — |
| | PEEK | | — | — | — | — | 80 |
| | Glassy carbon | B | 8 | — | — | 20 | 20 |
| | Glassy carbon | A | — | 55 | — | — | — |

TABLE 8-continued

|  |  | Example | | | | |
|---|---|---|---|---|---|---|
|  |  | 16 | 17 | 18 | 19 | 20 |
| Glassy carbon | D | — | — | 30 | — | — |
| Wear Factor | mm³/kgf·km | $1.0 \times 10^0$ | $2.0 \times 10^{-2}$ | $9.2 \times 10^{-2}$ | $2.6 \times 10^{-2}$ | $2.9 \times 10^{-2}$ |
| Chemicals Resistance | Weight Increase % | 0 | 0 | 2.9 | 0.42 | 0.38 |
|  | Dimensional Change % | 0 | 0 | +0.3 | +0.4 | +0.4 |
| Injection moldability |  | ◯ | △ | X | △ | △ |
| Bending Strength kgf/cm² |  | 1400 | 740 | 750 | 1600 | 1540 |
| Appearance of Molded Product | Number of Blister | 0 | 0 | 10 | 0 | 0 |
|  | Number of Flow Mark | 0 | 0 | 10 | 0 | 0 |

Injection moldability:
◯ Good
△ Short shot
X Drooling under foaming from nozzle

What is claimed is:

1. A resin composion for sliding movement, comprising (a) 90-30% by weight of a thermotropic liquid crystalline polymer which is a (co)polymer containing at least a monomer unit represented by the following formula and (b) 10-70% by weight of a spherical glassy carbon characterized by a particle fracture surface having a glassy luster and exhibiting a loss in weight of not more than 5% by weight when held in air at 350° C. for 30 minutes:

2. A resin composition for sliding movement as set forth in claim 1, wherein said glassy carbon is prepared by carbonizing a thermosetting resin.

3. A resin composition for sliding movement, comprising (a) 87-40% by weight of a thermotropic liquid crystalline polymer which is a (co)polymer containing at least a monomer unit represented by the following formula, (b) 10-50% by weight of a spherical glassy carbon characterized by a particle fracture surface having a glassy luster and exhibiting a loss in weight of not more than 10% by weight when held in air at 350° C. for 30 minutes, and (c) 3-40 % by weight of graphite, provided the total of the components (a), (b) and (c) is 100% by weight:

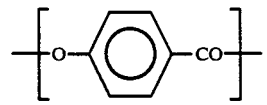

4. A resin composition for sliding movement, comprising (a) 87-40% by weight of a thermotropic liquid crystalline polymer which is a (co)polymer containing at least a monomer unit represented by the following formula, (b) 10- 50% by weight of a spherical glassy carbon characterized by a particle fracture surface having a glassy luster and exhibiting a loss in weight of not more than 10% by weight when held in air at 350° C. for 30 minutes, and (c) 3-20% by weight of a fluorocabon resin, provided the total of the components (a), (b) and (c) is 100% by weight:

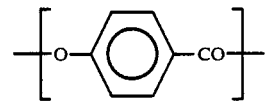

5. A resin composition for sliding movement as set forth in any of claims 1 to 4, wherein said thermotropic liquid crystalline polymer is a wholly aromatic polyester.

6. A resin composition for sliding movement as set forth in claim 5, wherein said wholly aromatic polyester comprises as monomer components hydroxybenzoic acid, biphenol and phthalic acid.

7. A sealing member to be fitted in end faces of a pair of scrolls disposed in mesh with each other in a scroll type compressor or vacuum pump, said sealing member being formed by a polymer composition containing as essential components (a) 90-50% by weight of a thermotropic liquid crystalline polymer which is a (co)polymer containing at least a monomer unit represented by the following formula and (b) 10-50% by weight of a spherical glassy carbon characterized by a particle fracture surface having a glassy luster and exhibiting a loss in weight of not more than 5% by weight when held in air at 350° C. for 30 minutes, provided the total of the components (a) and (b) is 100% by weight:

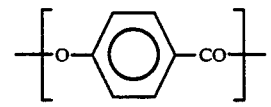

8. A sealing member as set forth in claim 7, wherein said thermotropic liquid crystalline polymer is a wholly aromatic polyester.

9. A sealing member as set forth in claim 7, wherein said glassy carbon is prepared by carbonizing a thermosetting resin.

* * * * *